Feb. 7, 1950 G. GORTON 2,496,995
GUIDE COLLET
Filed April 3, 1945 4 Sheets-Sheet 1
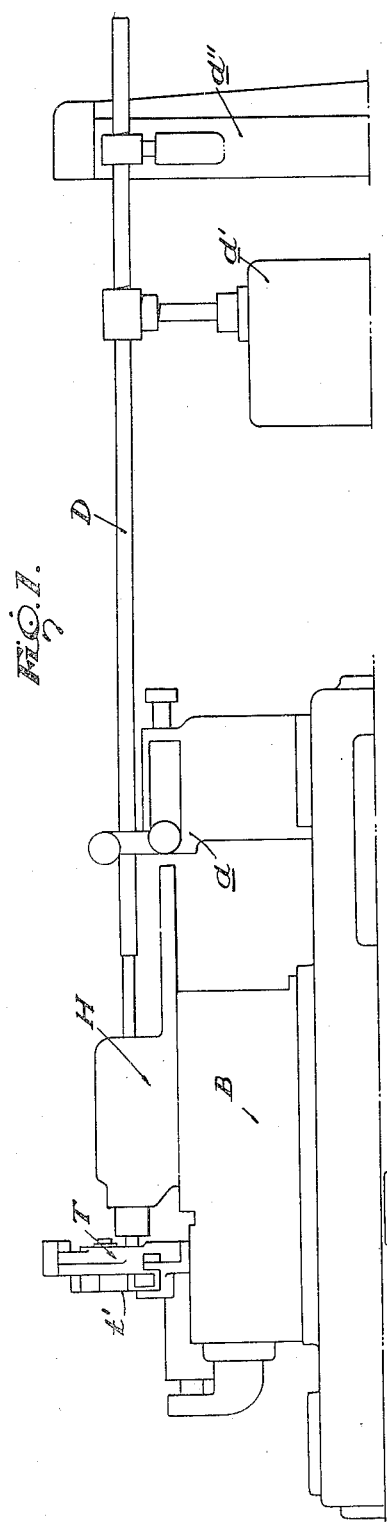
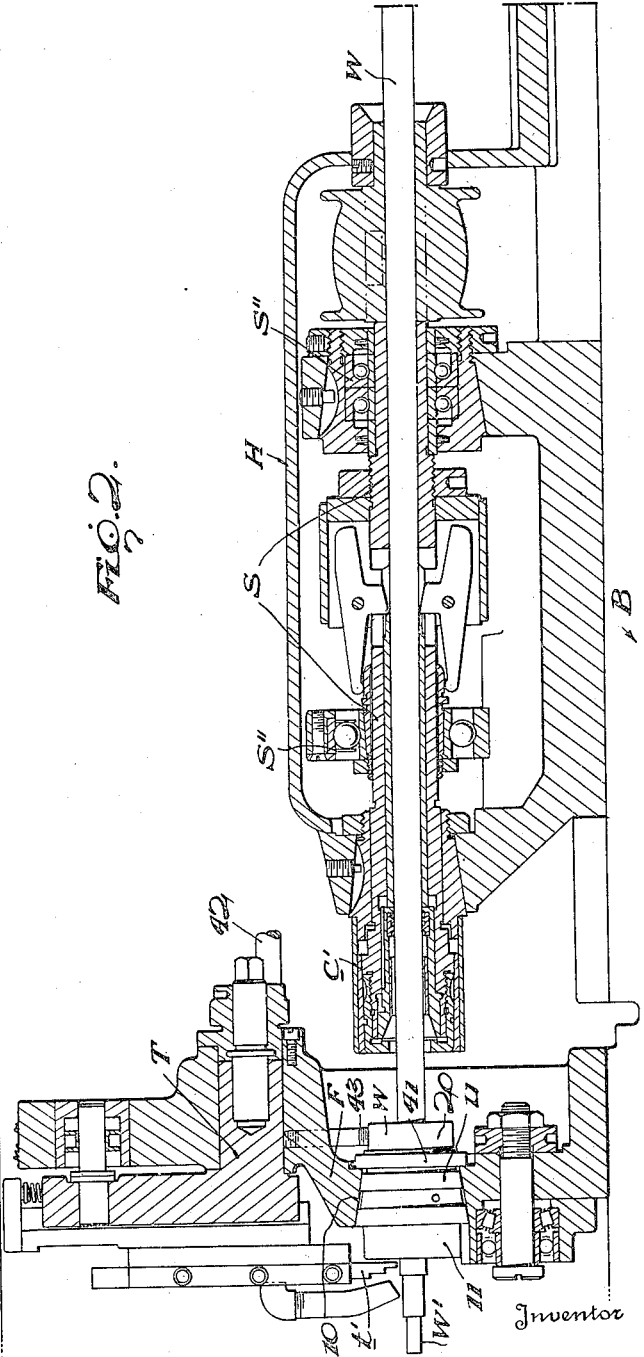
Inventor
George Gorton
By Peck & Peck
Attorneys

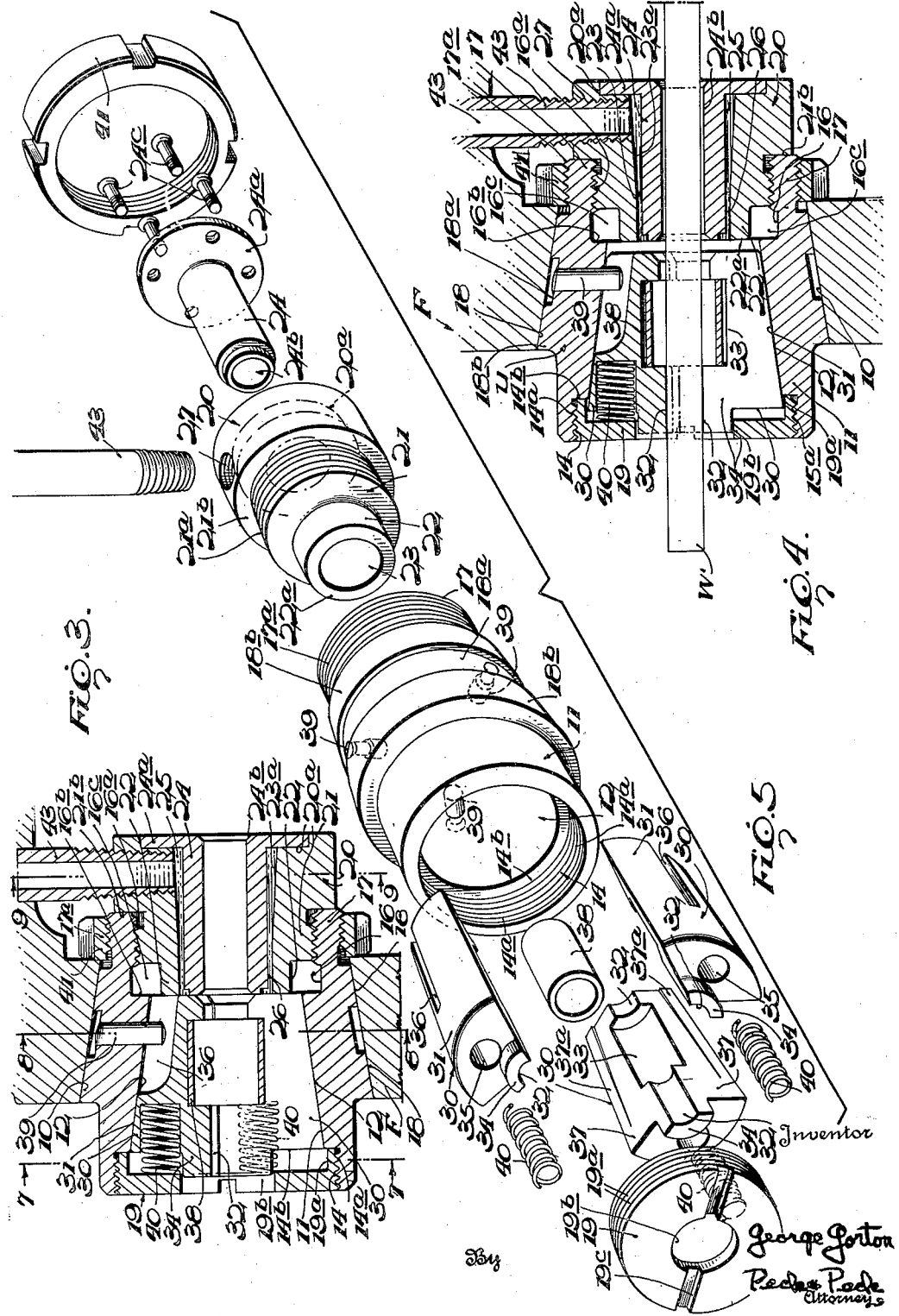

Feb. 7, 1950     G. GORTON     2,496,995
GUIDE COLLET
Filed April 3, 1945     4 Sheets-Sheet 3
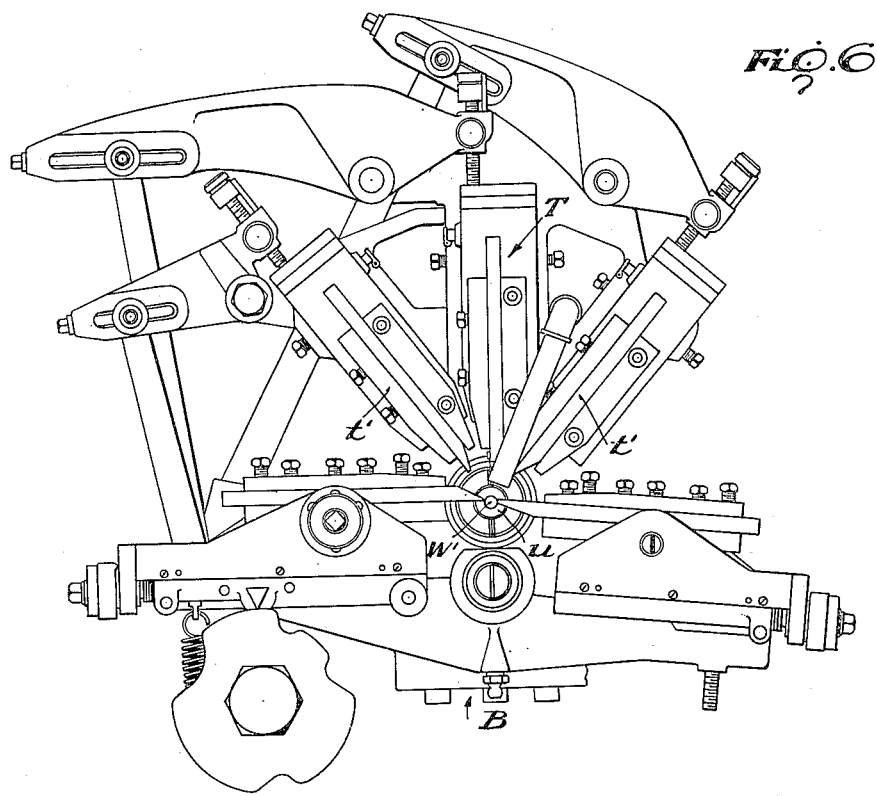
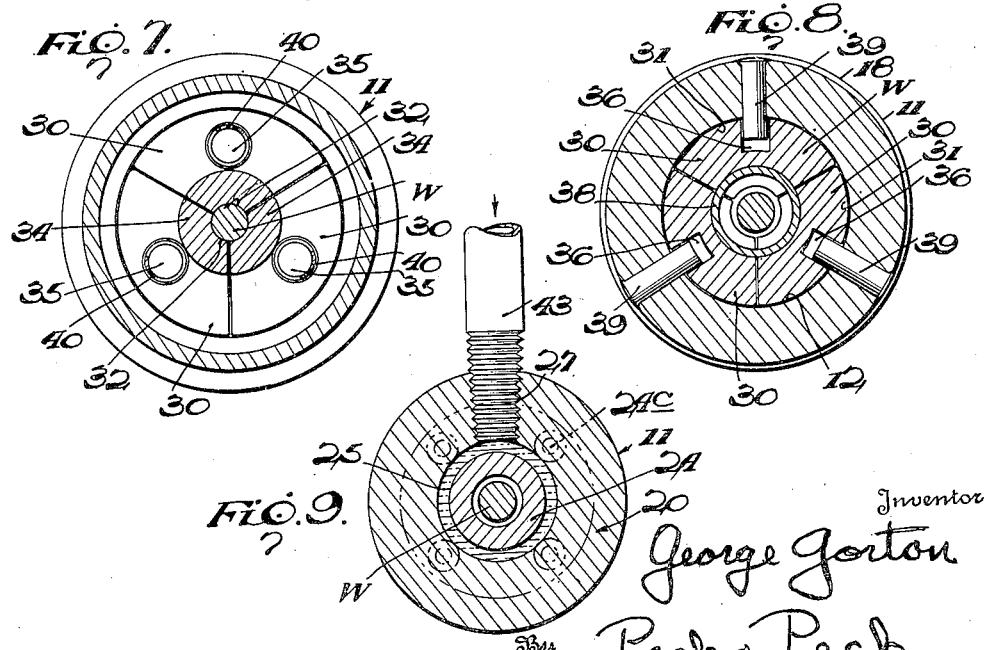
Inventor
George Gorton
By Peck & Peck
Attorneys Feb. 7, 1950 G. GORTON 2,496,995
GUIDE COLLET
Filed April 3, 1945 4 Sheets-Sheet 4
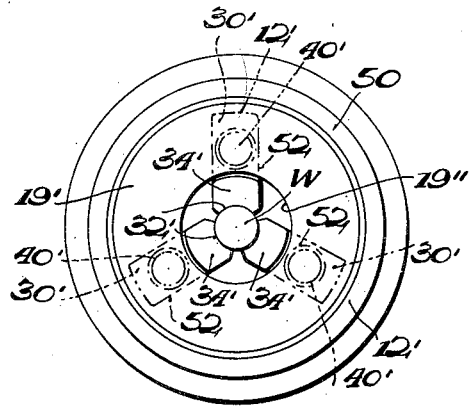
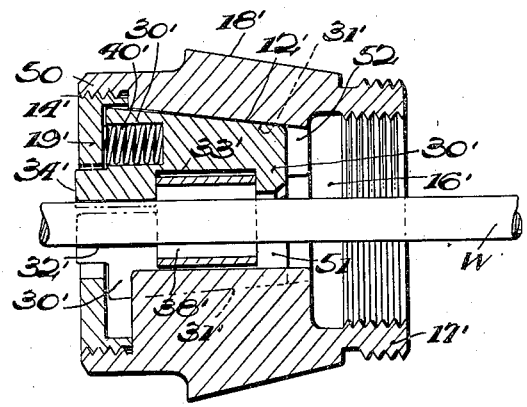
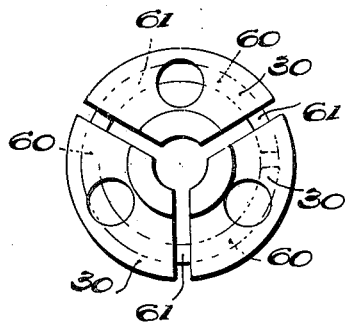
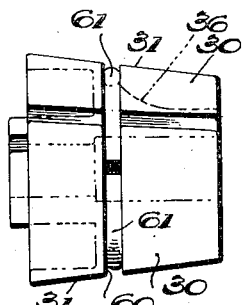
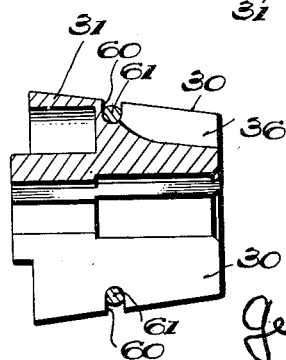
Inventor
George Gorton
By Peck + Peck
Attorneys Patented Feb. 7, 1950

2,496,995

UNITED STATES PATENT OFFICE 2,496,995

GUIDE COLLET

George Gorton, Racine, Wis., assignor to George Gorton Machine Co., Racine, Wis., a corporation of Wisconsin Application April 3, 1945, Serial No. 586,330

10 Claims. (Cl. 82—38)

This invention relates to certain improvements in guide collets for supporting variable diameter stock in screw machines and the like machine tools; and the nature and objects of the invention will be readily recognized and understood by those skilled in the arts to which it relates in the light of the following detailed explanation and description of the accompanying drawings illustrating what I at present consider to be the preferred embodiments or mechanical expressions of my invention from among various other embodiments, modifications, forms, designs, constructions and combinations of which the invention and the various features thereof are capable within the broad spirit and scope of the invention.

My present invention is concerned with machine tools generally of the types in which a length of bar stock to be operated upon is fed to and supported at a cutting tool head or work station where the stock is to be worked upon by suitable cutting, or the like, tools; and the invention is directed toward overcoming certain problems and reducing or substantially eliminating certain difficulties and disadvantages encountered with the structures and means heretofore generally used or employed for supporting and guiding the bar stock at the work station adjacent the point at which the stock is operated upon by the cutting tool or tools. The invention is particularly directed toward overcoming the difficulties and disadvantages and undesirable results developed by and resulting from the specific conditions encountered and met with in supporting and guiding the bar stock at the location or point at which the stock is worked, in automatic screw machines of the types known to the art as the so-called "Swiss" or "Peterman" type, such as is exemplified by the automatic screw machines known and identified as the "Gorton 16-A automatic screw machine" manufactured and sold by George Gorton Machine Company of Racine, Wisconsin.

It is a general object of my invention to substantially eliminate the conditions and the difficulties and disadvantages resulting therefrom, that are encountered in the operation and use of bushings as generally employed in guiding and supporting the bar stock being fed to the cutting tools of a machine tool, such as an automatic screw machine, by providing a means or mechanism for guiding and for accurately supporting the bar stock at the cutting tool station while the stock is being worked upon by the cutting tools, which will reduce to a minimum the possibility of the bar stock, when of one of the range of sizes or diameters for which such mechanism is designed and intended, being cut or damaged by or jamming in such supporting and guiding mechanism as a result of any inaccuracies in the diameter of the bar stock, or of other conditions causing unevenness or inequalities in the shape or size of the bar stock.

A further object is to provide a mechanism for guiding bar stock being fed to the cutting tool station of a machine tool, such as an automatic screw machine, and for positioning the stock at the cutting tool station, which guide and support mechanism will be automatically self-adjustable in operation and use to efficiently receive and operate with bar stock of different diameters or sizes, so that the number of support and guide mechanisms required to equip any particular automatic screw machine or the like machine tool, will be substantially reduced.

A further object is to provide such a bar stock guide and support mechanism capable of efficiently operating with a plurality of sizes or diameters of bar stock, and so designed and constructed as to provide a self-contained unit capable of being readily removably installed in mounted position at the cutting tool station of a machine tool, for receiving and holding bar stock to be fed therethrough to working position at the cutting tool station, so that a set of such guide and support units may be provided to equip a particular machine tool by providing each unit of the set as adapted to operate with a series of different diameters of bar stock from the diameters of bar stock constituting the complete range of bar stock diameters with which such particular machine tool is capable of operating; and further to so design and construct each of such self-contained bar stock support and guide units that it may be readily removably mounted and accurately positioned in a structurally and mechanically simple form of mounting or holder provided in the machine tool, with each of said units being constructed to standard mounting design and size so that each unit is interchangeable with any other unit in the mounting or holder of the machine tool.

Another object is to provide an automatically self-adjusting mechanism capable of receiving and supporting bar stock of different sizes or diameters to be fed therethrough to the cutting tool station of a machine tool, characterized by bar stock gripping and holding members mounted therein positioned spaced around the axis of the path of feed of the bar stock longitudinally therethrough to, in practical effect, define the bore through which the bar stock extends and is fed, with such bar stock gripping and holding members being constantly yieldingly urged and forced inwardly toward each other and toward the axis of the bar stock receiving bore defined thereby, by forces continuously applied thereto by suitable force generating means.

A further object is to provide a design and arrangement of such a bar stock support and guide mechanism that embodies the force loaded and automatically self-adjusting bar stock gripping and holding members, by which such members are mounted for bodily movements longitudinally of the path of the feed of the bar stock therethrough and are also bodily movable radially or laterally relative to the path of the bar stock feed, toward and from each other to contract or expand such members and thereby reduce or increase the diameter of the bar stock receiving bore defined thereby, by the positive action of a camming or wedging surface in direct engagement with camming or wedging surfaces formed on such members.

A further object resides in providing such a bar stock guide and support mechanism or unit, in which the elements and parts thereof, including the bar stock gripping and holding members, are so assembled and arranged in operative position forming the unit, that flushing fluid circulating spaces or passages are formed through the unit for continuous flow of flushing fluid under pressure therethrough during the operation of the unit; and further to locate the flushing fluid intake at the end of the unit into which the bar stock is fed and to locate the flushing fluid outlet or discharge around the bar stock at the end of the unit at which the bar stock is fed from the unit to the cutting tool station so that when a lubricating oil is employed as the flushing medium the parts and elements of the unit are lubricated thereby and lubricant is supplied to the bar stock at the cutting station.

A further object is to provide such a bar stock guide and support unit formed for flow or circulation of flushing fluid therethrough, which will be capable when mounted and installed position in a machine tool of being readily coupled into the lubricating oil system of the machine tool so as to receive oil under pressure from such system for flow and circulation through the unit as a flushing and lubricating medium.

With the foregoing general objects, features and results in view, as well as certain other objects, features and results which will be readily apparent from the following description, my invention consists in certain novel features in design and construction and in combination and arrangement of parts and elements, all as will be more fully and specifically referred to and set forth hereinafter.

Referring to the accompanying drawings in which similar reference characters refer to corresponding parts and elements throughout the several figures thereof:

Fig. 1 is a general schematic view in outline of the so-called "Swiss" type of automatic screw machine and showing a bar stock feed mechanism or system in operative association with the screw machine for feeding bar stock thereto.

Fig. 2 is a view, partly in vertical longitudinal section and partly in side elevation, of the headstock and rotary bar stock spindle therein and the cutting tool station or frame, with a bar stock guide and support unit of my invention shown in side elevation mounted in operative position at the tool station, a length of bar stock being also shown in operative position in and extending through the rotary spindle of said headstock, to and through said bar stock guide and support unit at the cutting tool station.

Fig. 3 is a vertical, longitudinal section through the self-adjusting bar stock guide and support mechanism or unit of my invention, in mounted position in the mounting or holder structure therefor at the cutting tool station or frame, the bar stock gripping and holding members of the unit being shown in their maximum contracted positions moved inwardly toward each other to form the minimum diameter bore for the bar stock.

Fig. 4 is a view in vertical longitudinal section, similar to Fig. 3, but showing the bar stock gripping and holding members forced into their expanded position by a length of bar stock engaged thereby and extended in operative position therebetween through said stock guide and support unit.

Fig. 5 is a prospective view of the bar stock guide and support mechanism or unit of my invention as disclosed in Figs. 3 and 4, with the parts and elements thereof disassembled but shown as associated in their relative positions for assembling.

Fig. 6 is an end elevation of the automatic screw machine of Figs. 1 and 2, taken at the outer side of the cutting tool or working station end of the machine, and particularly showing the forward end of a guide and support unit of my invention in mounted position in the machine at the cutting tool station with a length of bar stock extended therefrom in operative relation with the cutting tools.

Fig. 7 is a vertical, transverse section through the bar stock guide and support mechanism or unit of my invention taken as on the line 7—7, of Fig. 3.

Fig. 8 is a vertical, transverse section through the guide and support unit taken as on line 8—8, of Fig. 3.

Fig. 9 is a vertical, transverse section taken through the bar stock guide and support unit as on the line 9—9, of Fig. 3 and particularly showing the inlet or intake passage or chamber formed in the unit for receiving flushing fluid, with the flushing fluid supply line in communication therewith for discharging flushing fluid into the unit.

Fig. 10 is an end elevation of a modified form and construction of bar stock guide and support mechanism or unit of my invention, taken as from the bar stock discharge end of the unit located at the cutting tool station.

Fig. 11 is a vertical, longitudinal section through the modified form of bar stock guide and support unit of Fig. 10.

Fig. 12 is an end elevation of a set or assembly of jaw members of the preferred form of Figs. 3, 4 and 5, showing an arrangement of external ring for securing the jaw members in assembled relation.

Fig. 13 is a side elevation of the set of jaw members of Fig. 12, and showing the external grooves in the jaw members for receiving the external retaining ring therein.

Fig. 14 is a view, partly in vertical section, and partly in side elevation of the jaw assembly with the external retaining ring, of Figs. 12 and 13.

Primarily as an example for purposes of explaining the principles and features of a bar stock guide and support mechanism or unit of my invention, and not by way of limitation, I have illustrated and described herein an automatic screw machine of the so-called "Swiss" type, such as manufactured and sold by the George Gorton Machine Company of Racine, Wisconsin, and known and identified as the "New Gorton 16-A" automatic screw machine. I have selected this particular type of automatic screw machine because it is adapted to work and operate upon small diameter bar stock in the production of very small and delicate parts or elements which must be very accurately made in order to obtain the necessary precision in the finished part or element and it is such operations that present to a high degree and in aggravated form the conditions and the difficulties and disadvantages resulting therefrom, which my invention overcomes or substantially reduces.

However, it is to be understood that my present invention is not limited or restricted to use in or with the particular type and design of automatic screw machine illustrated herein as an example, or to such an automatic screw machine intended to work upon any particular size or diameter of bar stock, or to automatic screw machines generally, as the invention contemplates adoption and use, and is adapted to use, with other types and forms of machine tools generally in the operation of which it is necessary or desirable to feed bar stock to a point or location at which various work operations are to be performed on the bar stock, either while the bar stock is stationary or while the same is being rotated, and to guide and support the bar stock at such point or location so as to securely hold the stock in a predetermined accurate position against play or lateral or radial displacement during the work operations thereon, and while permitting the stock to be fed to such point or location whether or not the stock is at the same time being rotated.

Referring now specifically to the automatic screw machine of the type of the example illustrated in Figs. 1, 2 and 6, such machine includes the base or bed B on which the rotary work spindle casing or headstock H is mounted for longitudinal reciprocation toward and from the cutting tool station or frame T, for feeding the bar stock forwardly toward said station, in a manner well understood in this art.

The headstock H, referring now to Fig. 2, mounts and carries a longitudinally hollow rotary work spindle S which extends longitudinally through the headstock and which is suitably rotatably mounted and journaled therein in bearings $s'$ mounted in the headstock. This rotary work spindle S is longitudinally hollow to receive and carry the bar stock W, and to periodically feed the same forward to the cutting tool station or frame T by longitudinal, forward movements of the headstock H, while rotating the bar stock as a unit therewith during those periods of operation in which rotation of the bar stock is required. The work spindle S is provided with any suitable or desired chucks, collets or the like means, such as the collet $c'$ located at the forward or discharge end of the work spindle S and projecting from the headstock H adjacent to but spaced rearwardly a distance from the cutting tool station or frame T, by which the bar stock W is longitudinally fed to the cutting tool station T by forward step by step movements of the headstock H as a unit, while the bar stock positioned in and extending through the hollow work spindle S is held gripped by the rotary spindle collet $c'$ for rotation with the spindle as a unit in the usual manner familiar in this art. Suitable mechanism such as cam means (not shown) are provided, as is well understood by those familiar with this type of automatic screw machine, for controlling the back and forth movements, including the step by step forward feed movements of the headstock H. The back and forth movements of the headstock are suitably timed or synchronized with the rotary movement of the usual cam means (not shown) for controlling the operative movements of the cutting tools $t'$ located at the cutting tool station T, as will be referred to hereinafter.

In the particular type of automatic screw machine of the example hereof, the cutting tool station or frame T is positioned on the bed or base B of the machine spaced forwardly from the headstock H and in a position disposed generally transversely of and across a forward projection of the path of longitudinal back and forth movements of headstock H. This cutting tool station or frame T, referring now to Figs. 2 and 6 in particular, includes in this instance an upstanding vertically disposed wall or frame portion F which is located in position transversely across and spaced forwardly from the forward end of the headstock H and the rotary work spindle S. This wall or frame F, in the example hereof, is formed of appreciable thickness and is provided with a circular aperture or opening 10 therethrough axially aligned with the longitudinal axis of the rotary work spindle S, and designed and adapted to receive a bar stock guide and support mechanism or unit U of my invention in position therein to support and guide bar stock to be fed therethrough to the forward side of the unit in position to be operated upon by the cutting tools $t'$ mounted at the cutting tool station of the frame T.

In this example, in the illustrated type of automatic screw machine, the cutting tools $t'$ are suitably operatively mounted at the forward side of the cutting tool station or frame T and are disposed generally radially relative to and positioned spaced around the longitudinal axis of the bar stock being fed thereto by the operation of the headstock H, so that bar stock W mounted in and extending longitudinally through the rotary work spindle S, extends forwardly from the work spindle through the guide and support means mounted in the frame or holder F of the cutting tool station frame T, with the forwardly projecting portion of the bar stock $w'$, referring now to Fig. 2 of the drawings, held and supported in position to be worked upon by the radially disposed tools $t'$.

A bar stock feed means or system is usually provided for operative association with an automatic screw machine such as the machine of Figs. 1 and 2, and such a feed means or system is purely diagrammatically illustrated in Fig. 1 as including a suitable bar stock feed tube D which is suitably mounted and supported at its forward end from the base of the machine by support structure $d$ and at its rear end by support means $d'$ and $d''$, there being suitable mechanism (not shown) provided in operative association for feeding the length of bar stock forwardly through such feed tube D. This feed tube D, referring to Fig. 1, is supported in horizontally disposed position in axial or longitudinal alignment with the rotary work spindle S in the headstock H, with the forward end of the feed tube D spaced a distance rearwardly from the headstock H. Such bar stock feed means or systems are of various types well known in the art and call for no detailed disclosure or description herein, beyond the schematic illustration exemplifying such a means or system, presented by Fig. 1.

In the usual operation of the automatic screw machine of the type of Fig. 1, the bar stock W to be worked and operated upon is received in and extends longitudinally through the hollow rotary work spindle S, for rotation with such spindle while being held and gripped firmly therein, with the forward end portion w' of the length of bar stock W extending forwardly to and being located at the cutting tool station T in position to be operated upon by the radially disposed cutting tools t', as will be clear by reference to Fig. 2. In order to maintain and hold the portion w' of the bar stock W in the required accurate position relative to the cutting tools t' during the operation of such tools upon the bar stock portion w', a guide and support means or unit U embodying the principles and features of my present invention is mounted in the frame or holder F to receive and guide and hold the bar stock extended therethrough in position for operation of the cutting tool t' thereon.

In accordance with the preferred expression of my invention, such a bar stock guide and support means or unit may be generally referred to as of a "collet" type of mechanism, but it is to be understood that the use of the term "collet" in the title of this application and any use of the term hereinafter in describing the invention is to be interpreted in a broad generic sense, as the term is primarily used for the sake of brevity and not by way of limitation, either mechanically or functionally. Thus, the unit U of the invention is typified by a housing or casing 11, having a plurality of bar stock gripping and holding members 30 contained therein which are so constructed, mounted and operatively associated as to be automatically self-adjusting to guide and support the bar stock being fed through the unit, while firmly gripping and holding the stock against lateral play or displacement and against jamming in the unit under all usual operating conditions encountered in the feeding and operation of bar stock to and in an automatic screw machine.

In a preferred mechanical expression or form of bar stock and support unit or collet, of my invention, such as the unit U disclosed in Figs. 2 to 9 inclusive, a generally cylindrical, hollow casing, housing or barrel 11 is provided (see Figs. 3, 4 and 5), which is internally formed throughout an intermediate portion of the length of the opening or bore therethrough, to provide the annular, conical inner surface 12 concentric with the longitudinal axis of the casing 11, such conical surface tapering or constantly decreasing in diameter rearwardly through the casing from the forward or cutting tool station end portion thereof to the rear, bar stock receiving end portion of the casing. The bore or opening through the hollow casing 11 at the forward end thereof is formed of enlarged diameter relative to the diameter at the adjacent forward end of the annular conical surface 12, to provide an end recess 14 in the casing having the internally threaded inner annular wall surface 14a concentric with and parallel to the longitudinal axis of the casing, with an inner annular shoulder 14b disposed in a plane generally transverse to the longitudinal axis of the casing, between the inner end of the wall surface 14 of the recess and the outer enlarged end of the annular conical surface 12.

The rearwardly tapering, conical surface 12 of the casing 11 extends with constantly decreasing diameter through the casing to an enlarged diameter chamber 16 formed in the rear end of the casing 11 concentric with the longitudinal axis of the casing and of such conical surface 12. The inner surface or wall surrounding the chamber 16 is provided with screw threading 16a extending a distance inwardly on inner surface but terminating spaced a distance outwardly of the casing from the inner annular surface 16b formed between the reduced diameter end of the conical or tapered surface 12 and the inner end portion of the side wall of the chamber 16, with said annular surface 16b disposed in a plane transverse to the longitudinal axis of the casing. The casing 11 at the rear end portion thereof is formed of reduced external diameter so as to provide a ring portion or neck 17 concentric with the longitudinal axis of the casing, with the external surface of such ring forming portion 17 of the casing being provided with screw threading 17a, so that, in effect, there is provided an internally and externally screw threaded neck 17 forming the rear end portion of the casing 11 surrounding the chamber 16 and concentric with the longitudinal axis of the casing.

The exterior surface of the casing 11 intermediate the forward end portion thereof and the rear end portion of the casing which is formed by the annular neck or ring 17, is of greater external diameter than the external diameter of the forward and rear portions of the casing 11, and such enlarged diameter intermediate portion is suitably machined, or otherwise formed, to provide an annular, rearwardly inclined or tapered, conical surface 18 around the exterior of the casing concentric with the casing axis, so as to provide a conical seating surface for mounting the unit U in the bore or opening 10 in the frame or holder F at the cutting tool station T of the automatic screw machine of Figs. 1 and 2. If desired, as in the example hereof, an annular groove 18a may be formed in and around the exterior conical surface 18 of the casing 11, so as to form, in effect, spaced ring portions 18b on and around the exterior of the casing, with each ring portion providing an annular seating surface tapered or inclined rearwardly at the same angle of inclination to the longitudinal axis of the casing, as will be clear by reference to Figs. 3, 4 and 5 of the drawings, such groove 18a serving a purpose to be referred to hereinafter.

A circular closure cap or plate 19 is provided having an external diameter to fit and be received into the enlarged diameter recess 14 having the threaded inner wall surfaces 14a at the forward end of the casing 11. This cap or closure plate 19 is provided with an annular, peripheral skirt or flange 19a having the surrounding exterior surface thereof in continuation of the outer peripheral surface of the plate, and the combined exterior peripheral surface of the plate and flange is provided with screw threading 19a therearound and thereon to engage and thread into the internal screw threading 14a of the enlarged diameter recess 14 at the forward end of the casing. The closure cap or plate 19 is formed with a central aperture or opening 19b therethrough, and the closure plate may, if desired, be provided with a groove 19c disposed diametrically across the outer side of the cap or plate for engagement by a suitable tool for mounting and removing the plate in and from mounted, assembled position in the casing 11. In mounted position, the plate 19 is screwed into the enlarged diameter recess 14 at the forward end of the casing with the skirt or peripheral flange 19a extended inwardly with its inner edge surface bearing against and seated on the annular shoulder 14b surrounding the adjacent enlarged diameter end of the conical surface 12 at the inner side of the enlarged diameter recess at the forward end of the casing.

A cylindrical bar stock guide head 20 is provided for mounting in the neck or ring 17 at the rear end of the casing 11 of the unit U, and this cylindrical head 20, referring now to Figs. 3, 4 and 5, is formed with an intermediate portion 21 of reduced diameter having external screw threading 21a therearound, to fit and be threaded into the neck or ring 17 with the shoulder 21b formed by the inner side surface of the head 20 surrounding the reduced diameter portion 21, bearing against and seated on the rear outer end edge of the neck 17. Thus, in mounted position the head 20 is located and positioned at the exterior and in substantial rearward continuation of the casing 11, but with the external diameter of the head 20 slightly less than the external diameter of the threaded neck or ring 17, so as to avoid rearwardly obstructing the threaded external surface 17a of the neck 17, as will be clear by reference to Figs. 3 and 4.

The inner end portion 22 of the head 20 is formed of reduced external diameter relative to the diameter of the intermediate portion 21, so that in mounted position of the head 20 the exterior annular wall surface of the portion 22 is spaced from the surrounding inner surface of the enlarged recess 16 formed in the rearward end of the casing 11, with the inner edge 22a of the reduced diameter inner end portion 22 of head 20 terminating at the forward reduced diameter end of the conical inner surface 12 of casing 11, and being disposed in approximately the plane of the shoulder 16b at the inner end of recess 16. The external diameter of the inner end portion 22 is less than the internal diameter of the forward end of the conical bore which provides the surface 12 in the casing 11, with the result that an annular chamber 16c is formed around the inner end of the head 20 between the reduced diameter portion 22 and the inner side wall of recess 16, with the chamber 16c in open communication at its forward side with the conical bore of the casing 11 which forms the conical or tapering surface 12 therewithin.

The cylindrical body of the head 20 is formed with a circular bore or passage 23 disposed axially therethrough, which passage has a gradually increasing diameter rearwardly, in this instance from a location along the length of the bore substantially opposite the portion 21 of the body 20, so that, the bore 23 is formed with the rearwardly outwardly tapering section 23a opening outwardly through the rear side or face of the head. A recess 20a is formed in the rear face or side wall of the head 20, concentric with the enlarged diameter end of the tapering section 23a of the bore 23.

A cylindrical, bar stock guide sleeve or tube 23 having one end thereof formed with an outwardly extended radial flange therearound to provide a mounting head 24a, is provided for mounting in and extending through the bore 23—23a, of the head 20 concentric with said bore. The guide tube or sleeve 24 has the bore 24b therethrough of an internal diameter slightly greater than the external diameter of the maximum size or diameter of bar stock to be received therein and fed therethrough, in which a length of bar stock W is disclosed extending into the unit U through the guide sleeve 24 of the guide head 20. The external diameter of the sleeve 24 is less than the smallest diameter portion or section of the bore 23 which is located at the inner end portion of the head 20.

The bar stock guide tube or sleeve 24 is mounted in assembled position in the head 20 disposed in and extending through the bore 23—23a of the body of the head 20, concentric with such bore, with the guide sleeve head 24a seated in the recess 20a and rigidly secured in such mounted position by suitable machine screws or the like fastening means 24c (see Fig. 5) threaded into the head 20. Thus, in mounted position the guide sleeve 24 extends completely through the bore 23 of the body which forms the head 20, and due to the external diameter of the sleeve relative to the internal diameters of the bore 23—23a of the head 20, an annular flushing fluid receiving chamber 25 is formed within the head 20 around the sleeve 24 and between the external surface of the sleeve 24 and the outwardly tapering inner surface of the rear portion 23a of the head bore 23, which chamber at its inner side is completely open and discharges into the annular passage 26 formed between the external surface of the sleeve 24 and the reduced diameter inner end length or section 23 of the head bore, such passage 26 being in effect an open, unobstructed continuation of the chamber 25, with the annular passage 26 in open unobstructed communication at its inner end with the conical bore of the casing 11. The head 24a of the guide sleeve 24 and the seating recess 20a in the head 20 for receiving head 24a, are preferably accurately formed and machined so that the head 24a in seated, assembled position forms an effective closure plate for the rear end of the flushing fluid receiving chamber 25 formed within the head 20 to prevent and avoid any substantial or objectionable leakage of flushing fluid from the chamber 25 around the head 24a. The head 20 is formed with a radially disposed, internally screw threaded bore 27 therethrough opening at its inner end into the chamber 25 (see Fig. 5 in particular), for receiving and for connection with a suitable flushing fluid supply pipe 43 for discharging flushing fluid into the chamber 25 within the head.

Bar stock gripping jaw members are mounted and assembled and contained within the longitudinal, tapered bore forming the conical or tapered surface 12 within the casing 11, spaced around the path of bar stock movement through the casing, between the closure cap or plate 19 at the forward end of the casing and the inner end of the bar stock guide head 20 at the rear or bar stock receiving end of the casing, for guiding, supporting and holding bar stock being fed through the unit U to the cutting tool station, such as the station T of the automatic screw machine of the illustrated example. A possible form which such bar stock gripping jaw members may take in carrying out the principles and broad features of my invention, is exemplified by the bar stock jaw gripping members 30 of the example of the invention as illustrated in Figs. 3, 4, 5, 7, 8, and 9.

In this form of the invention the jaw members 30 are formed as longitudinal sections or segments of a tapered or frustro-conical solid body or plug (generally referred to herein as "conical") having the same external diameters and the same angle of taper or inclination to the longitudinal axis of the conical body, as the internal diameters and the angle of taper or inclination of the portion of the conical surface 12 formed by the conical bore within the casing 11, into which such tapered or conical body is to be received, with the external conical surface of the body completely engaged with the complementary portion of the conical surface 12. This conical body from which longitudinal sections or segments thereof form the jaw members 30, is, in this instance, of a longitudinal length less than the longitudinal length of the bore within the casing 11 from the inner reduced diameter portion of the conical surface 12 to the inner side or face of the mounted closure cap or plate 19, with the conical body having the external diameter at its smallest diameter end corresponding to and substantially the same as the internal diameter at the inner or smallest diameter end of the conical bore in the casing 11 which presents the conical internal surface 12. Thus, such conical body has external dimensions and shape to fit into the smaller diameter end of the bore defined by the conical surface 12 with its external tapered surface in complete engagement with the adjacent portions of the conical surface 12 throughout the longitudinal length of such conical body, but with the end of the body of greatest external diameter spaced inwardly a distance from that end of the conical surface 12 of greatest internal diameter.

If such a preformed conical body is the medium used from which to form the gripping jaw members 30 as longitudinal sections or segments of such a body, the body is preferably provided with an axial bore therethrough, and the members 30 are formed by accurately cutting longitudinal, radially disposed slots completely therethrough to the axial bore in the body so as to thus divide the body into a series of longitudinal segments or sections. In this instance, three (3) identical jaw members 30 are formed by cutting three (3) such longitudinal and radial slots through the body spaced equal distances apart around the body so as to thus divide the body into three (3) identical longitudinal sections or segments. Thus, each member 30 is formed as a longitudinal segment or section of a conical body so that each member 30 has a longitudinally inclined, transversely arcuate, convex outer surface 31 at the outer side or face of the member, with a longitudinally disposed, centrally located, arcuate bar stock receiving groove or recess 32 (formed by a portion of the surface of the axial bore in the conical body) at the inner narrower side of the body. Each jaw member 30 is also formed with an enlarged arcuate recess or pocket 33 therein intermediate the opposite ends of the bar stock receiving groove 32, in longitudinal or axial alignment with such groove, and having a greater radius of curvature than the radius of curvature of the arcuate groove 32, but with both arcuate surfaces generated about the same axis.

Each jaw member 30 is also provided at the forward end thereof, that is the end of greatest width, with a projecting lip 34 at the inner side thereof with the bar stock receiving recess 32 extending across the inner face of said lip and opening through the outer or forward end thereof, as will be clear by reference to Fig. 5. The end of each member 30 of greatest width, that is the forward end, is provided with a longitudinally disposed bore or recess 35 therein, while the outer convex, arcuate surfaced side of the member is formed with a centrally located longitudinal groove 36 opening through the rear end, that is the end of smallest diameter, of the member 30.

The inner side of each member 30 presents opposite flat faces 37 angularly disposed relative to each other, and preferably each of these flat faces or surfaces 37 is formed with a relatively narrow raised portion providing a very thin rib 37a along the outer edge of such surface, as will be clear by reference to Fig. 5.

The jaw members 30 are initially assembled together in operative relation on and around a connecting sleeve or ring member 38, with the sleeve member 38 removably received and seated in the recesses 33 in the jaw members, and with the opposite end edges of the sleeve member 38 abutting and engaged against the opposite end walls, respectively, of the recess 33. Thus, the assembled jaw members 30 will be maintained by the sleeve 38 against longitudinal movements relative to each other, and when so assembled, the jaw members 30 and sleeve 38 form, in effect, a frustro-conical or tapering body with the adjacent flat faces 37 of the jaw members engaged, in this instance, by the thin, edge rib members 37a thereof, and with the sleeve member 38 concentric with the axis and forming, in effect, a portion of the longitudinal, central or axial bar stock receiving bore, opening or passage extending through and between the assembled jaw members 30 spaced therearound, as defined by the arcuate grooves 32 of the assembled jaw members 30.

It is understood, of course, that, if desired, instead of forming the jaw members 30 from a frustro-conical body as above referred to, these members may be separately and independently formed and constructed in any suitable or desired manner.

This initial assembly of the jaw members 30 with and around the sleeve member 38, is then inserted into the conical bore defined by the tapering surface 12 in the casing 11, through the forward enlarged diameter recess 14 of the casing, the end closure plate or cap 19 having been removed, with the end of the jaw member assembly of smallest diameter innermost, and the outer convex, arcuate surfaces 31 of the jaw members 30 conforming to and seating against the tapering or conical surface 12 within the casing. In this position, referring now to Fig. 3 which is the position of maximum contraction or inward movement toward each other of the jaw members 30, the tapering or conical surface 12 confines or wedges and positively holds the jaw members in such position against radial outward movements away from each other to expanded or opening positions. With the jaw members inserted in assembled position, in the bore of the casing 11, confined against radial outward movements, by the conical surface 12 of the casing, the end closure plate or cap 19 is screwed down into mounted position in the enlarged recess 14 at the forward end of the casing 11, with the guide lips 34 of the jaw members 30 received in and freely extending through the central aperture or bore 19b of the closure cap 19. Due to the length of the jaw members 30, when such members are wedged or confined by the surface 12, in their position of maximum inward movement in the bore of the casing 11, the forward ends, that is the ends of greatest width of the jaw members 30, are spaced a distance inwardly from the inner surface or face of the cap 19 so that these jaw members are movable or displaceable longitudinally in the tapered or conical bore of the casing from their position of maximum inward movement, in a forward direction toward the closure cap 19 positions in the portion of the conical bore of the casing of increasing diameter. When in such latter positions the jaw members are also bodily movable or displaceable radially outwardly away from each other within the limits of the wedging or camming surface 12, to expanded positions.

Guide pins 39 are provided extending radially through the casing 11 and projecting a distance into the tapered or conical bore thereof for engaging into the grooves 36 of the jaw members 30, in order to maintain the jaw members against rotation in the casing, while freely permitting longitudinal movements as well as radially inward and outward movements, of the jaw members 30. In this instance, of course, three (3) such guide pins 39 are provided and such pins are properly located in the casing 11 at spaced points therearound so as to align with and extend into the grooves 36, respectively, of the jaw members 30 assembled in the casing, as will be clear by reference to Fig. 8. It is to be noted that in the specific assembly hereof, the heads or outer ends of the pins 39 are located in the grooves 18a formed in the seating surface 18 around the exterior of the casing, thus in effect countersinking the heads of such pins below the seating surface 18, to avoid interference with or interruptions in such surface.

The jaw members 30 so mounted and assembled in the casing 11, are constantly urged or forced by suitable force generating means, in a direction longitudinally and inwardly of the casing to maintain the jaw member surfaces 31 in engagement with the tapering or conical surface 12, which surface 12 forms a wedging or camming surface positively engaged with the longitudinally tapered or inclined and transversely arcuate outer surfaces 31 of the jaw members 30, such latter jaw member surfaces forming in effect cooperative wedging or camming surfaces with the conical surface 12. For instance, such force generating means may, as in the specific example hereof, take the form of expansion springs 40 interposed between the forward ends of the jaw members 30 and the closure cap or plate 19. Such expansion springs 40 may be formed, as here shown, of a relatively light coil spring type, with one of such springs provided in position compressed between the inner end of each jaw member 30 and the cap or closure plate 19, each spring 40 being received and seated in the longitudinally disposed bore 35 provided at the forward or enlarged end of each jaw member 30. Each spring in operative assembled position is thus disposed with its axis substantially parallel to the longitudinal axis of the casing and being under compression, will exert forces acting longitudinally of the jaw members 30 to move or force such jaw members longitudinally inwardly toward or into the reduced diameter end of the casing bore to continuously engage the surfaces 31 thereof with the tapering annular camming surface 12 defining and surrounding the casing bore.

The springs 40 are so designed and mounted as to be partially compressed, even with the jaw members 30 in their maximum inwardly displaced position in the maximum contracted positions thereof, as illustrated in Fig. 3 of the drawings, so that the springs 40 at all times and continuously exert forces on the jaw members 30 acting to move or force said members longitudinally inwardly of the casing 11 and to thus maintain the surfaces 31 of the jaw members in camming engagement with the wedging or camming surface 12 in the casing.

The jaw members 30 are forced by the springs 40 to their position of maximum longitudinal displacement inwardly in the tapered or conical bore of the casing, and are wedged or cammed into their position of maximum contraction or inward displacement toward each other, to thus provide a bar stock receiving bore, opening or passage extending longitudinally or axially through the casing between the jaw members, as defined by the longitudinally disposed bar stock receiving grooves 32 spaced around the longitudinal axis of the jaw assembly. In such position of maximum contraction, the bar stock receiving bore or passage therebetween is of the minimum diameter which such jaws are capable of defining, with such bar stock receiving bore or passage longitudinally and axially aligned with and forming a forward continuation of the bar stock receiving bore or passage formed by and through the tubular guide sleeve 24 in the guide head 20 at the bar stock receiving end of the casing 11 of unit U.

Longitudinal displacement or bodily movement of the jaw members 30 forwardly through the tapered or conical bore in the casing 11 defined and surrounded by the conical surface 12, moves the jaw members into position in the increasing diameter portions of the casing bore, so that the jaw members may be moved bodily radially outwardly to expanded positions increasing the diameter of the bar stock receiving bore or passage defined by the jaw member grooves 32. However, the springs 40 constantly exert longitudinally inwardly acting forces on the jaw members to force the members longitudinally inwardly of the casing bore and thus continuously maintain such members in engagement with surface 12, which surface acting in engagement with the inclined surfaces 31 of the jaw members 30, will wedge or cam the jaw members inwardly toward each other.

A unit U of the invention with the bar stock gripping jaw members 30 operatively assembled in the casing 11 of the unit, is mounted and installed, referring now to Fig. 2, in connection with Figs. 3 and 4, in operative position in the frame or holder F at the cutting tool station T of the automatic screw machine of the illustrated example. The aperture or opening 10 in the frame or holder F is circular in form and has the surrounding wall thereof tapered rearwardly toward the headstock S to provide a seating surface of conical form having the same angle of inclination as the angle of inclination of the seating surface 18 around the exterior of the casing 11 of unit U. Unit U is inserted into the aperture or opening 10 from the forward side thereof with the seating surface 18 of casing 11 fitting into and seating on the tapered surface of the wall of aperture 10, these seating surfaces being accurately machined so as to accurately receive and position the casing 11 in mounted position in the frame or holder F. The unit U is removably secured and fixed in mounted position in holder F by a locking ring 41 which is internally screw threaded and of an internal diameter to fit over and be threaded onto and around the neck ring 17 of the casing 11, which is located at the rear side of the frame F with the casing U in mounted position therein. This ring 41 is then screwed up onto neck 17 until the forward side thereof engages against the rear side of frame F around the aperture or opening 10 therethrough to draw unit U into mounted position and firmly clamp and lock the casing 11 in such position in the frame or holder. With the unit U in mounted position in holder F, the bar stock guide tube or sleeve 24 in the guide head 20 of the unit U is accurately longitudinally or axially aligned with the rotary work spindle S of the headstock H for receiving bar stock fed thereto, as will be clear by reference to Fig. 2.

The automatic screw machine of the type illustrated in Figs. 1, 2 and 6, includes a system for supplying lubricating oil under pressure to the cutting tools t', which system usually includes a suitable fluid reservoir (not shown). In the assembly hereof such a cutting tool lubricant fluid system of the automatic screw machine is schematically represented in Fig. 2 by the lubricant fluid pipe line 42. The bar stock guide and support unit U is coupled and connected with the lubricant supply system 42 of the automatic screw machine so that lubricant under pressure is supplied from the system 42, to the chamber 25 of the unit U, for use of such lubricant fluid as a flushing medium, as well as a lubricant, for the unit U. In the present example the unit U installed in the frame or holder F, has the chamber 25 connected with the lubricant fluid system 42 of the automatic screw machine by means of a pipe or conduit 43 connected into the internally threaded bore 27 formed through the head 20 of the unit U. In this manner flushing and lubricating fluid is supplied under pressure to the chamber 25 formed in the head 20 of the unit.

In operation of a bar stock guide and support collet or unit U, referring to Fig. 2, in connection with Fig. 4, the bar stock W, extends from the headstock collet c' into the bar stock guide head 20, and forwardly through the unit U to project at the forward side thereof as the portion of the bar stock w' located at the cutting tool station for operation thereon of the cutting tools t'. The jaw members 30 for the unit U are so dimensioned, including the bar stock receiving grooves 32 thereof, as to operate with bar stock of certain specified diameters, and the minimum size of bar stock to be operated with such jaw members will have a diameter slightly greater than the minimum diameter of the bore or passage defined by the grooves 32 between the jaw members in their position at their limit of inward movement longitudinally of the casing bore, with the jaw members wedged or cammed by the surface 12 into their positions of maximum contraction or movement radially inwardly toward each other. (See Fig. 3.) Preferably, with the ranges of the smaller diameter bar stock, for example, the minimum size bar stock will have a diameter 1/64" greater than the minimum diameter of the bore or passage extending through and between the jaw members as defined by the bar stock receiving grooves 32 with the jaw members in their position of maximum contraction as aforesaid. Similarly, the maximum size of bar stock for which the jaw members 30, in any particular instance are designed to be operated, will have a diameter slightly less than the maximum diameter of the bar stock receiving bore or passage through and between the jaw members 30 when the jaw members are in position at their limit of maximum longitudinal movement outwardly or forwardly through the casing bore and in positions of maximum expansion or movement radially outwardly away from each other within the limits permitted by the camming or wedging surface 12. (See Fig. 4.)

Thus, when bar stock W of one of the range of diameters for which the jaw members 30 are designed to operate, is extended into and fed forwardly of the unit U through the guide tube or sleeve 24 of the head 20 of the unit, and forwardly between the jaw members 30 through the bore or passage defined by the bar stock receiving grooves 32 and the jaw connecting sleeve or ring 36, the bar stock W as it enters between the inner ends of the jaw members 30, being of greater diameter than the diameter of the stock receiving bore or passage between the jaw members, will force such members to move longitudinally forwardly against the rearwardly acting forces exerted on the jaw members by the compressed expansion springs 40, because the jaw members are wedged or confined by the surface 12 against radial outward movements and will therefore be cammed forwardly by such surface 12 under the forces exerted on the jaw members by the forwardly moving bar stock W. This forward longitudinal movement of the jaw members 30 will continue until such jaw members have been moved to a position in the tapered bore at which the inclination of the surface 12 will permit a sufficient radially outward displacement of the jaw members 30 to increase the diameter of the stock receiving bore or passage therebetween to a diameter to receive the bar stock and permit of the bar stock being rotated therein and/or fed forwardly therethrough to the cutting tools t'. However, continued longitudinal forward movement of the jaw members 30 by the forwardly feeding bar stock W after the jaw members have been sufficiently expanded or forced apart to receive such bar stock, is overcome and prevented by the rearwardly or longitudinally inwardly acting forces exerted on the jaw members by the increased compression of the expansion springs 40 caused by the longitudinal forward movement of the jaw members, so that, the jaw members are constantly forced rearwardly or longitudinally inwardly by the forces exerted thereon by the springs 40 into engagement with the inward tapering surface 12 and are continuously cammed or wedged inwardly toward each other by such surface 12 into firm and tight gripping engagement with the bar stock as the bar stock is fed therethrough.

With a length of bar stock W extended from the headstock H of the machine, forwardly through the unit U and the jaw members 30 therein, as referred to and explained above, and with a portion of the bar stock w' projecting forwardly from the unit U at the cutting tool station for operation thereon of the cutting tools t', the automatic screw machine of this example is operated in the usual manner with the rotary work spindle S of the headstock H rotating the bar stock W and with the headstock feeding the bar stock step by step forwardly to the cutting tools t'. During the rotation and/or the feeding of the bar stock W through the guide and support collet or unit U, the jaw members 30 of the unit will, as a result of the combined action of the springs 40 and the surfaces 12 of the casing engaged with the surfaces 31 of the jaw members, be constantly maintained in continuous firm engagement with the bar stock which is tightly gripped and held in the receiving grooves 32 of the jaw members continuously, while permitting longitudinal forward feed of the bar stock and rotation thereof in and through the grooves 32 of the gripping jaws 30 spaced around the bar stock. In the event of any inaccuracy or inaccuracies in the diameter of a length of bar stock being fed therethrough, which may result in an increased diameter portion of the bar stock in the form of a "swell" or "enlargement," such portion instead of jamming in the guide and support or of starting the jaw members to cutting the bar stock, will engage the jaw members and move them forwardly a distance until the tapered surface 12 permits the enlarged portion of the bar stock to force the jaw members 30 outwardly a sufficient distance to enable such enlarged portion to pass through the jaw members without jamming or cutting. During this operation the springs 40 are continuously exerting rearwardly acting forces on the jaw members 30 to maintain such members in engagement with the surface 12, so that, this latter surface maintains the jaw members wedged or cammed inwardly toward each other into tight gripping engagement with and around the bar stock at all times and under all conditions encountered in operation.

It is to be particularly noted that the angle of inclination or taper of the surface 12 to the longitudinal axis of the casing 11 is relatively small, so that the pressure or lateral radially acting loads and forces imposed on the portion of the bar stock $w'$ being worked on by the radially disposed cutting tools $t'$ at the cutting tool station, will not tend to and cannot force the jaw members, or any of them, radially outwardly to open the jaw members, the jaw members 30 at all times and under all lateral loads imposed on the bar stock, being maintained closed upon and tightly gripping the stock under the combined action of the springs 40 and the engaged camming or wedging surfaces 12 and 31. With respect to this feature of the invention, it is not limited to any specific angle or angles of inclination as such angles may be varied to meet the particular requirements as to diameters of bar stock to be handled by the gripping jaws of the collet or unit, the only requirement being that the angle of inclination should be such as will not permit the jaw members or any of them, being forced or wedged laterally outwardly to break the grip of the jaw members on the bar stock being fed therethrough.

Each bar stock guide and support mechanism or unit of the invention, such as the unit U of the example illustrated herein, is designed to receive and work with a range of diameters of bar stock, which range is determined and limited by the range of radial movement of the jaw gripping members 30 within the casing 11 between maximum contracted positions thereof moved inwardly toward each other to define the minimum diameter of stock receiving passage between the jaw members, and maximum expanded positions thereof moved outwardly away from each other to define the maximum diameter of the stock receiving bore or passage formed therebetween and therethrough. The assembly or set of jaw members 30 of a unit U are readily removable from the casing 11 by removing the forward end closure cap or plate 19. In accordance with my invention it is contemplated and intended, if desired, that a series of sets or assemblies of jaw gripping members 30 be provided as equipment for a particular machine, each of which sets of jaw members will be designed and dimensioned to operate with a certain range of bar stock diameters of the maximum range of diameters with which such particular machine has been designed to operate, so that, the machine can be readily, quickly adapted for operation with a range of diameters of bar stock, by mounting the particular set or assembly of the jaw members 30 for such range of diameters, in the casing 11. The sets of jaw members are thus formed as interchangeable and as universally adapted to mounting and operation in the casing 11 installed in the frame or holder F of the machine. In this manner the number of sets or assemblies of jaw members 30 necessary to meet the requirements of a given machine, will be materially reduced over the number of guide and support bushings of the types heretofore generally used for such operation, necessary to meet the requirements of such machine. For example, with a machine designed to operate upon bar stock of diameters from $\frac{1}{16}''$ to $\frac{7}{16}''$ only approximately twenty (20) sets or assemblies of jaw members of the present invention are required.

With a bar stock and guide collet or unit of the invention, it is found that after the bar stock receiving grooves 32 of a set of jaw members 30, originally designed and dimensioned to handle a specific range of diameters of bar stock, become worn somewhat larger in use, such jaw members are still usable on a variation of larger diameter stock without any reworking or refinishing of the jaw members 30 or the bar stock receiving grooves 32 thereof.

As hereinbefore referred to, a unit U, including the casing 11, is removably mounted in the frame or holder F at the cutting tool station, and a complete unit U comprising the casing 11 and a set of bar stock gripping jaws 30 assembled therein may be provided for each range of bar stock diameters to be worked upon, if preferred or found desirable.

In the operation of a bar stock guide and support collet or unit of the invention, as the bar stock is fed through the unit while being tightly gripped and held by the jaw members 30, the bar stock being usually rotated in the jaw members as it is fed therethrough, very fine cuttings or particles of metal are formed which will particularly tend to collect around the connecting sleeve or ring 38, so that after several hours of operation such cuttings may collect in sufficient quantity to seriously interfere with operation. With the design and construction of my invention, such as exemplified by the unit U of the instant example, during operation of the machine, lubricating oil or other suitable flushing fluid, is supplied under pressure through the pipe 43 from the system 42 of the screw machine with which the support collet is in combination, into the chamber 25 in the head 20 of the unit U. This fluid then flows under pressure from the chamber 25 inwardly through the annular passage 23 into the conical bore surrounded by the surface 12 in the casing 11, in which the jaw members 30 are operatively assembled and positioned, and from such bore flows outwardly through the aperture 19b in the closure cap 19 and through and between the projecting lip portions 34 of the jaw members 30 around the bar stock held therein. In effect the jaw members 30 are bathed in a body of lubricating oil within the bore of the casing 11 with the oil under pressure and being forced not only through the bar stock receiving passage and grooves 32 defining the same, but also through the connecting collar or sleeve 38 and between the adjacent flat faces 37 of the jaw members which are slightly spaced apart by the thin ribs 37a thereon to form very narrow slots or passages therebetween. In this manner the guide and support unit or collet U is continuously flushed of any cuttings or fine particles of metal produced during operation of the machine to feed bar stock therethrough, while at the same time lubricating all of the mechanism of the unit and also supplying lubricant to the bar stock being worked upon by the cutting tools by discharge of lubricant from the unit through the end aperture 19b of the closure plate 19 over and around the bar stock W at the working point.

In Figs. 12, 13 and 14, a preferred construction and arrangement is disclosed for holding the jaw members 30 against relative longitudinal movements, as well as for maintaining a set or group of the jaw members together in assembled relation when inserting and removing the set in and from the casing 11. In this construction and arrangement, each jaw member 30 is provided with a transversely disposed groove 60 in and across the outer side thereof opening through the surface 31 between the forward end of the jaw members 30 and the forward end of the guide slot 36 therein, such groove 60 being located adjacent the forward end of the guide slot 36. The groove 60 in each jaw member 30 is curved and forms the arc of a circle generated about the axis of the bar stock receiving passage formed between a set of the assembled jaw members 30.

With a set of the jaw members 30 in assembled relation, the grooves 60 of the jaw members are positioned in longitudinal alignment to thus form an endless circular, circumferential groove in and around the exterior of the assembled jaw members 30, which groove is concentric with the axis of the bar stock receiving passage formed between and extending through the jaw members 30. A split ring 61 of spring material is provided to form a retaining ring for the assembled set of jaws 30, and this ring 61 is positioned by springing the same over the assembled set of jaw members 30 and permitting the ring to snap into the circumferential groove formed by the aligned grooves 60 of the jaw members. The depth of each groove 60 in a jaw member 30 is such that the circumferential groove formed with a set of jaw members in assembled relation, is greater than the thickness of the body of the ring 61, while the external diameter of the circumferential groove at the inner surface or wall thereof, is less than the internal diameter of the ring 61. Thus, this split, spring material ring 61 is retained in position received and fitting into the circumferential groove formed around the assembled set of jaw members 30 by the grooves 60 of such jaw members, and retains the set or group of jaw members 30 in proper assembled relation while permitting bodily radial displacement of the jaw members toward and from each other for the required operation of the jaw members in assembled operative relation and position in the unit U, as hereinbefore described.

By this arrangement the jaw members 30 of a set or assembly thereof, are maintained in the desired relative positions against longitudinal movements relative to each other when in operative, assembled position in the casing 11 of the unit U. The provision of the retaining ring 61 in the grooves 60 of an assembled group or set of the jaw members 30, facilitates insertion and removal of the jaw members 30 from a unit U, as a group or set, while the group or set when removed from the unit U for storage is kept and maintained intact as a group or set, and the possibility of separation of the jaw members of the set, with possible inadvertent substitution of a different size jaw member or members, during handling and storage is reduced to a minimum. Also, by this construction and arrangement of the outer grooves 60 across a jaw member 30, the manufacture of the jaw members is facilitated and the cost of such manufacture is reduced over the cost of the construction and arrangement of jaw members 30 of the form of Figs. 3, 4 and 5, having the inner side recesses 33 for assembly about an internal sleeve 38, is materially reduced.

A modified form of an automatically self-adjusting bar stock guide and support collet or unit embodying the principles of my present invention, as exemplified in the preferred form hereinbefore described and explained, is disclosed in Figs. 10 and 11 of the drawings. In this modified form the unit includes as a primary structure, an externally, longitudinally tapered or frustro-conical solid body 50 which provides the tapering or conical annular external seating surface 18' therearound, and which at its forward end is formed with the internally screw threaded recess 14' and at its rear end is formed with the recess 16' to provide the internally and externally threaded neck ring 17' adapted to receive and seat a bar stock guidehead 20 similar to that hereinbefore described.

This solid body 50 is formed with an axial bore 51 extending longitudinally therethrough for receiving and through which the bar stock W being fed to the cutting tool station T is received and fed forwardly through the unit.

The body having the axial bore 51 therethrough is formed with a plurality of jaw member receiving slots 52 extending longitudinally therethrough from the forward end recess 14' to the recess 16' at the rear end of the body, spaced around and extending radially a distance outwardly into and through the body from the axial bore 51. In this instance, three (3) such slots 52 are provided in the body spaced apart equi-distant around the bore 51 and at their inner sides opening into the bore, with the outer side of each slot 52 within the body 50 being formed with a rearwardly and inwardly inclined jaw member wedging or camming surface 12', such camming or wedging surfaces 12' being each disposed at the same angle of inclination to the longitudinal axis or bore 51 of the body 50.

Jaw members 30' are provided of an external shape to fit into and be slidably confined in the grooves 52, respectively, of the body 50. These bar stock gripping jaws 30' are identical. Each is provided with its outer edge inclined to provide the inclined outer edge surface 31' having the same angle of inclination 12' of the slot 52 in which such jaw member is received. The opposite inner edge of each jaw member is formed to be parallel with the axis of the bore 51 when the jaw member is in mounted, operative position in a slot 52 of the body 50, and such inner edge is formed with a longitudinal, transversely curved or arcuate bar stock receiving groove 32' extending therein from end to end of the jaw member. Each jaw member 30' is also provided with a forwardly projecting lip 34' in forward continuation of the inner edge portion of the jaw member, with the bar stock receiving groove 32' extended forwardly of its inner edge and outwardly through the outer end of the lip. In this particular example, each jaw member is also formed with a transverse recess 33' therethrough, which recess opens through the inner edge of the jaw member, the recess being located intermediate the forward and rear ends of the jaw member.

The jaw members 30' are assembled in operative position in the slots 52, respectively, of the body 50 with the outer inclined edge 31' of each jaw member engaged with the inclined camming or wedging surfaces 12' along the inner side of each slot, and with the bar stock receiving groove 32' along the inner edge of each jaw member disposed in and along the bore 51 extending through the body. The width of each jaw member 30' is such that in its position of maximum inward or rearward movement in its receiving slot, the inclined surface 31' thereof is engaged with the inclined surface 12' of the slot and wedged thereby against outward movement, while in its position of maximum forward or outward movement longitudinally of the body 50, the jaw member is movable outwardly in the slot radially of the axis of the bore 51 into engagement with the inclined surface 12'.

The jaw members 30' are confined in the slots 52, respectively, of the body 50 by the end closure plate 19' having the central aperture 19'' therethrough, in which aperture the forwardly projecting lips 34' of the jaw members are slidably received.

A connecting ring 38' is mounted received in and extending through the jaw recesses 33' so as to connect the jaw members together for simultaneous longitudinal movements.

The basic operation and functioning of this modified form of bar stock guide and support collet or unit, is generally the same as that described in connection with the preferred form of the unit as hereinbefore described, in that, the bar stock W is extended forwardly through the axial bore of the body 50 between and engaged by the inner edge grooved surfaces 32' of the jaw members 30' with the jaw members forced and maintained in gripping engagement with the bar stock as the stock is fed forwardly therethrough, under the combined action of the expansion springs 40' and the engaged camming or wedging surfaces 12' and 31' of each jaw member and its receiving slot 52. Increased diameter of the bar stock being fed through and between the jaw members 30' moves the jaw members forwardly in the slots against the springs 40, while forcing the jaw members radially outwardly in the slots to provide a bar stock receiving bore or passage between the jaw members of a sufficiently increased diameter to permit passage of the bar stock therebetween. But, under all conditions, as hereinbefore explained, the springs 40' will constantly force the jaw members inwardly so that the surfaces 12' of the jaw member slots 52, respectively, will wedge or cam the jaw members into tight gripping engagement with the bar stock. As with the preferred form of the invention, the angle of inclination of the surfaces 12' of the jaw member slots and of the surfaces 31' formed by the outer longitudinal edges of the jaw members, is, in each instance, such as to prevent the jaw members being forced outwardly to positions breaking or releasing the grip of the jaw members on the bar stock by radial loads or forces applied to the bar stock by the radially disposed cutting loads which may be imposed upon the bar stock by the cutting tools at the cutting station.

With this modified form of bar stock guide and support unit, the jaw members 30' will have a thickness in accordance with the external diameter of the bar stock to be fed through and held by the unit, so that, preferably, different thicknesses of jaw members will be provided for different diameters, or different ranges of diameters, of bar stock to be fed through the unit. Hence, in order to provide for working with a relatively wide range of diameters of bar stock, a plurality of body members 50 are required for more efficient operation, with each such body member 50 having its jaw receiving slots 52 formed of a width for receiving and working with a certain width of jaw member adapted to a certain bar stock diameter, or range of bar stock diameters.

It is to be noted that, preferably, the bar stock receiving grooves 32 of the jaws 30 of the form of units of Figs. 3, 4 and 5, and of the jaw members 30' of the modified form of Figs. 9 and 10, are, when of the curved or arcuate form for operation with bar stock of circular cross section, as in the examples shown, of a radius of curvature the same or approximately the same as the radius of curvature of the cross section of the bar stock to be received therein and fed therethrough. Hence, the bar stock engaging and gripping grooved inner edge surfaces form bearing surfaces which conform to the external contour of and engage the bar stock while permitting the bar stock being moved longitudinally therethrough and rotated therein, with the jaw members rigidly holding and supporting the bar stock against lateral or radial movement or play. Obviously, the shape of the bar stock receiving grooves in the jaw members may be other than arcuate or curved, in order to receive and operate with bar stock of angular cross sections which is fed through and between the jaw members without rotating such bar stock.

It will also be evident that various other forms, designs, constructions and arrangements may be resorted to without departing from the broad spirit and scope of my invention, and hence I do not desire or intend to limit the invention in all respects to the exact and specific disclosures hereof, as the broad concept, principles and features of the invention are capable of expression in various embodiments and forms.

What I claim is:

1. In mechanism for guiding and holding bar stock being fed therethrough, in combination, a casing structure provided with an internal annular surface therewithin concentric with the axis of the path of longitudinal movement of bar stock being fed through said casing, said annular internal surface being tapered at a rearward and inward inclination to the axis of the path of bar stock feed in a direction opposite the direction of feed, a guide head having a bar stock passage therethrough mounted at the bar stock receiving end of said casing, a removable closure having a bar stock discharge opening therethrough mounted at the opposite end of said casing, bar stock gripping jaw members mounted in said casing within said annular tapered surface and spaced around the path of bar stock feed therethrough, each of said jaw members being formed at the outer side thereof with a longitudinally disposed surface inclined rearwardly and inwardly to the axis of bar stock feed in a direction opposite the direction of such feed and being adapted to slidably engage said annular tapered surface, said jaw members being mounted for bodily movements in either direction longitudinally of the path of bar stock feed and also being mounted for bodily movements toward and from each other in radial directions relative to the path of bar stock feed, said jaw members when at the maximum positions of inward movement thereof longitudinally and rearwardly in said casing being adapted to be wedged inwardly toward each other to their positions of maximum inward movement, and expansion spring means mounted between the forward ends of said jaw members and the adjacent inner surface of said casing end closure for continuously exerting forces on said jaw members acting to move said jaw members rearwardly in a direction opposite the direction of bar stock feed to maintain said jaw members in wedging engagement with said tapered annular surface within the casing throughout the range of longitudinal movements of said jaw members in either direction.

2. In mechanism for guiding and holding bar stock being fed therethrough, in combination, a longitudinally hollow casing formed with a conical bore therewithin intermediate the opposite ends of the casing providing an internal tapered annular surface concentric with the axis of the path of longitudinal movement of bar stock being fed through said casing, said annular internal surface being tapered and inclined rearwardly and inwardly to the axis of the path of bar stock feed in a direction opposite the direction of such feed, bar stock gripping jaw members mounted within said casing spaced around the path of bar stock feed therethrough, said jaw members being formed at the inner sides thereof with longitudinally disposed bar stock engaging surfaces defining a bar stock receiving passage therebetween, said jaw members being formed at the outer sides thereof with longitudinally disposed surfaces complementary to said tapered annular surface and being adapted to slidably engage said annular tapered surface, a guide head located at the rear bar stock receiving end of said casing formed with a bar stock receiving passage therethrough axially aligned with the stock receiving passage formed between said jaw members, a closure at the forward discharge end of said casing having a bar stock discharge opening therethrough axially aligned with the passage in said guide head, said jaw members each having a length less than the axial length of said annular tapered surface and being mounted for movements in either direction in the casing between said guide head and said closure longitudinally of the path of bar stock feed and also being mounted for bodily movements toward and from each other in radial directions relative to the path of bar stock feed, and expansion springs mounted under compression between said closure at the forward discharge end of said casing and the adjacent forward ends of said jaw members for continuously exerting forces on the jaw members to move the jaw members longitudinally rearwardly in a direction opposite the direction of bar stock feed therebetween.

3. In mechanism for guiding and holding bar stock being fed therethrough, in combination, a casing having a conical bore therewithin forming a tapered annular surface concentric with the axis of the path of longitudinal movement of bar stock fed through the casing, said annular internal surface being tapered and inclined rearwardly and inwardly to the axis of bar stock feed in a direction opposite the direction of feed, bar stock gripping jaw members, constituting longitudinal sections of a conical body having the external diameter of its reduced diameter end corresponding to the internal diameter of the reduced diameter end of said annular tapered surface within the casing and having a length less than the length of said annular surface, said stock gripping jaw members being mounted within said casing spaced around the path of bar stock feed therethrough, each of said jaw members being formed at the inner side thereof with a longitudinally disposed bar stock engaging groove therealong, said jaw members being mounted for bodily movements in either direction longitudinally of the path of bar stock feed and also being mounted for bodily movements toward and from each other in radial directions relative to the path of bar stock feed, said jaw members at their maximum positions of inward movement thereof longitudinally and rearwardly in said casing in a direction opposite the direction of bar stock feed between said jaw members being adapted to be wedged by said annular tapered surface inwardly toward each other to their positions of maximum inward movement, and expansion spring means mounted under compression in operative association with said jaw members to continuously exert forces on said members to move the jaw members longitudinally rearwardly in the direction opposite the direction of bar stock feed therebetween to maintain the jaw members in engagement with said annular tapered surface throughout the range of longitudinal movements of said jaw members.

4. In mechanism for guiding and holding bar stock being fed therethrough, in combination, a longitudinally hollow casing formed with a conical bore therewithin intermediate the opposite ends of the casing providing an internal annular tapered surface therearound concentric with the axis of the path of longitudinal movement of bar stock being fed through said casing, the said annular internal surface being tapered and inclined rearwardly and inwardly relative to the axis of bar stock feed in a direction opposite the direction of feed, separate bar stock gripping jaw members mounted within said casing spaced around the path of bar stock feed therethrough, said jaw members being formed at the inner sides thereof with longitudinally disposed bar stock engaging surfaces parallel to the axis of the path of bar stock feed defining a bar stock receiving passage therebetween, said jaw members each having a length less than the length of said annular tapered surface and being mounted for movements in either direction in the casing longitudinally of the path of bar stock feed and also being mounted for bodily movements toward and from each other in straight line paths perpendicular to and radially of the path of bar stock feed, expansion spring means mounted under tension in operative association with said jaw members for continuously yieldingly applying forces to the jaw members to move said members longitudinally rearwardly in a direction opposite the direction of bar stock feed therebetween, the outer sides of said jaw members being provided with surfaces complementary to and slidably engaged with said tapered annular surface, the outer side of each of said jaw members being formed with a longitudinal groove therein, and guide pins mounted in position extending a distance radially inwardly from said annular tapered surface in positions slidably received in the outer side longitudinal grooves, respectively, of said jaw members to maintain said jaw members in laterally fixed positions against rotation around the path of bar stock feed therebetween.

5. In mechanism for guiding and holding bar stock being fed therethrough, in combination, a longitudinally hollow casing adapted to be mounted in normal fixed position against rotation, said casing being formed with a conical bore therewithin intermediate the opposite ends of the casing, said bore providing an annular tapered surface within the casing concentric with the axis of the path of bar stock feed through said casing, the said annular internal surface being tapered and inclined rearwardly and inwardly relative to the axis of bar stock feed in a direction opposite the direction of feed through the mechanism, separate bar stock gripping jaw members mounted within said casing spaced around the path of bar stock feed therethrough, said jaw members being formed at the inner sides thereof with longitudinally disposed bar stock engaging surfaces, said jaw members each having a length less than the length of said annular tapered surface and being mounted for movement in either direction in the casing longitudinally of the path of bar stock feed and also being mounted for bodily movements toward and from each other in radial directions relative to the path of bar stock feed, force generating means in operative association with said jaw members for continuously yieldingly applying forces to the jaw members to move said members longitudinally rearwardly in a direction opposite the direction of bar stock feed therebetween, each of said jaw members have the outer side thereof formed to engage said tapered annular surfaces to cause said latter surface to cam said jaw members inwardly toward each other as the jaw members are moved longitudinally inwardly in a direction opposite the direction of bar stock feed, each of said jaw members having a longitudinal groove formed in the outer side thereof, guide pins mounted in fixed position in said casing and being extended a distance radially inwardly from said annular tapered surface in positions slidably received in the outer side longitudinal grooves, respectively, of said jaw members, each jaw member being formed with a recess therein opening through the inner side thereof, and a connecting sleeve member mounted between said jaw members concentric with the axis of the bar stock passage formed by and between said members and being received and seated in said recesses, respectively, said connecting sleeve member having a length substantially equal to the internal length of said recesses.

6. In mechanism for guiding and holding bar stock being fed therethrough, in combination, a body having a bore extending longitudinally therethrough for receiving and through which bar stock is fed, said body being formed with radially disposed slots extending longitudinally through the body spaced around and opening along their inner sides into said bore, the outer longitudinal surfaces of said slots within the body being inclined rearwardly and inwardly through the body at the same angle of inclination to the axis of said bore and in a direction opposite to the direction of bar stock feed through the bore, bar stock gripping jaw members mounted in said slots, respectively, and each having the outer edge thereof formed to provide a surface inclined longitudinally of the member for wedging and guiding engagement with the inclined surface of the body slot in which mounted, said jaw members each having a longitudinal length less than the longitudinal length of the body slot in which mounted and being adapted for bodily movements longitudinally in either direction through said slots, said jaw members being mounted in said slots for movement toward and from each other, the inner edges of said jaw members being disposed in said axial bore and each being formed to provide a bar stock gripping surface for engaging bar stock being fed through said body bore, a removable closure at the forward ends of said slots having an aperture therethrough aligned with the axial bore through said body, and expansion springs mounted under compression between the forward ends, respectively, of each jaw member and said closure for continuously yieldingly exerting forces to move the jaw members longitudinally through said slots in a direction opposite the direction of bar stock feed through said body bore between said jaw members to cause said inclined slot surfaces to wedge said jaw members inwardly toward each other in any position to which said jaw members are longitudinally moved in said slots.

7. In mechanism for guiding and holding bar stock being fed therethrough, in combination, a longitudinally hollow casing formed with a conical bore therewithin intermediate the opposite ends of the casing providing an internal annular tapered surface concentric with the axis of the path of longitudinal movement of bar stock through said casing, said annular internal surface being tapered and inclined rearwardly and inwardly relative to the axis of the path of bar stock feed in a direction opposite the direction of such feed, a guide head mounted at the bar stock receiving end of said casing and being formed with an axial bore therethrough opening at its inner end into the conical bore surrounded by said annular surface, a bar stock guide sleeve mounted in and extending longitudinally through said head bore, said guide sleeve having an external diameter less than the internal diameter of said head bore to form an annular fluid receiving chamber in said guide head around said guide sleeve and in communication at its inner end with the conical bore in said casing, a fluid supply inlet through said head opening into the annular fluid chamber formed within the head, a removable closure plate mounted in the bar stock discharge end of said casing and having a central opening therethrough axially aligned with the guide sleeve in the guide head at the opposite end of the casing, bar stock gripping jaw members mounted in said casing within and concentric with said annular tapered surface, spaced around the path of bar stock feed therethrough and each being formed at the outer side thereof for slidable engagement with said annular tapered surface, said jaw members being mounted for movement in either direction in the casing longitudinally of the path of bar stock feed and being also mounted for bodily movements toward and from each other in radial directions relative to the path of bar stock feed, and said jaw members being formed to provide fluid passages longitudinally therebetween for flow of fluid therethrough from the fluid chamber formed in said guide head to the aperture in the closure plate at the bar stock discharge end of said casing for discharge of fluid from the casing through said aperture.

8. In mechanism for guiding and holding bar stock being fed therethrough, in combination, a casing formed with a chamber therewithin, bar stock gripping jaw members mounted in said chamber and defining and forming a bar stock receiving passage therebetween, a guide head mounted at one end of said casing and being formed with a bore therethrough opening at its inner end into said chamber, a bar stock guide sleeve mounted in and being extended longitudinally through said guide head bore in axial alignment with the axis of the passage within the chamber between said jaw members, said guide sleeve having an external diameter less than the internal diameter of the bore in said guide head to form an annular fluid receiving chamber in said head around said guide sleeve in communication with and discharging at its inner end into the jaw member receiving chamber in said casing, a removable closure member mounted in the bar stock discharge end of said casing opposite said guide head and being formed with a central opening therethrough axially aligned with the passage formed between said jaw members and with said guide sleeve for feed of bar stock outwardly therethrough from between the jaw members in said casing, and said guide head being formed with a fluid inlet into said guide head fluid chamber, said jaw receiving chamber and the central opening in said closure member forming passages for flow of fluid from said fluid receiving chamber through and around said jaw members to said closure member opening for discharge of fluid from the casing through said opening around bar stock being fed outwardly therethrough and therefrom.

9. In mechanism for guiding and holding bar stock being fed therethrough, in combination, a casing formed with a chamber therewithin, bar stock gripping jaw members mounted in said chamber and defining and forming a bar stock receiving passage therebetween, a closure for that end of said casing which receives the bar stock for feeding through the casing between and gripped by said jaw members, said receiving end closure formed with a bar stock receiving guide passage therethrough axially aligned with the passage formed between said jaw members, a closure member at the end of said casing opposite the casing receiving end thereof and having a central opening therethrough axially aligned with the passage between said jaw members for feed of bar stock outwardly therethrough from the jaw members in said casing, and said receiving end closure being formed with a fluid supply passage therethrough discharging into said jaw member receiving chamber for supplying fluid to said chamber, said jaw member receiving chamber and the central opening in said end closure forming passages for flow of fluid therethrough around and between said jaw members and outwardly from the chamber through the opening in said closure member around bar stock being fed outwardly therethrough.

10. In mechanism for guiding and holding bar stock being fed therethrough, in combination, a casing structure provided with an internal annular surface therewithin concentric with the axis of the path of bar stock feed therethrough, said internal surface being tapered and inclined inwardly and forwardly relative to the path of feed in a direction opposite the direction of feed, means securing said casing in fixed position against rotational movements about the path of feed therethrough, bar stock gripping jaw members mounted and confined within said casing structure spaced around the path of feed therethrough, each of said jaw members being formed at the outer side thereof with a longitudinally disposed surface inclined rearwardly and inwardly relative to the path of feed in a direction opposite the direction of feed and being adapted to slidably engage said annular tapered surface within the casing, said jaw members being mounted for bodily movements in either direction longitudinally of the path of feed and being also mounted for bodily movements in radial directions relative to the path of feed, means for maintaining said jaw members in fixed positions laterally relative to bar stock being fed therethrough and against rotational movements within the casing around the path of feed, and force generating means adapted to apply forces continuously to said jaw members acting in a direction to move said members longitudinally rearwardly in a direction opposite the direction of feed to maintain the outer inclined surfaces thereof in engagement with said tapered surface of the casing structure throughout the range of longitudinal movements in either direction of said jaw members.

GEORGE GORTON.

REFERENCES CITED

The following references are of record in the file of this patent:

UNITED STATES PATENTS

| Number | Name | Date |
|---|---|---|
| 167,984 | Bruen | Sept. 21, 1875 |
| 1,028,564 | Forward | June 4, 1912 |
| 1,379,165 | Burns et al. | May 24, 1921 |
| 1,625,540 | Hertzberg | Apr. 19, 1927 |
| 1,711,769 | Bell | May 7, 1929 |
| 2,067,442 | Frisz | Jan. 12, 1937 |
| 2,239,044 | Leighton | Apr. 22, 1941 |
| 2,328,002 | Gall et al. | Aug. 31, 1943 |
| 2,343,914 | Lloyd | Mar. 14, 1944 |
| 2,368,794 | Wilson | Feb. 6, 1945 |
| 2,369,330 | Wilson | Feb. 13, 1945 |
| 2,376,476 | Chatelain | May 22, 1945 |

FOREIGN PATENTS

| Number | Country | Date |
|---|---|---|
| 360 | Great Britain | of 1901 |
| 225,983 | Great Britain | of 1924 |
| 360,222 | Germany | Sept. 30, 1922 |
| 513,393 | Great Britain | of 1939 |